United States Patent [19]
Scully, Jr.

[11] Patent Number: 5,997,768
[45] Date of Patent: Dec. 7, 1999

[54] PELLETIZATION OF METAL SOAP POWDERS

[75] Inventor: Daniel F. Scully, Jr., Chesterfield, Mo.

[73] Assignee: Ciba Specialty Chemicals Corporation, Tarrytown, N.Y.

[21] Appl. No.: 08/084,388

[22] Filed: Jun. 29, 1993

[51] Int. Cl.⁶ .................................................. C11D 13/00
[52] U.S. Cl. ............................. 252/367.1; 252/183.11; 252/183.13; 554/195
[58] Field of Search ..................... 252/108, 174, 252/367, 183.11, 183.13, 367.1; 554/195

[56] References Cited

U.S. PATENT DOCUMENTS

| | | |
|---|---|---|
| 4,235,794 | 11/1980 | Rieber et al. . |
| 4,368,139 | 1/1983 | Pollock et al. . |
| 4,474,683 | 10/1984 | Story ........................................ 252/369 |
| 4,927,548 | 5/1990 | Hirsch et al. .............................. 252/17 |
| 5,028,486 | 7/1991 | Dunski . |

FOREIGN PATENT DOCUMENTS

| | | |
|---|---|---|
| 2002185 | 7/1971 | Germany . |

*Primary Examiner*—Walter D. Griffin
*Attorney, Agent, or Firm*—Luther A. R. Hall

[57] ABSTRACT

A metal soap pellet is made by compressing or heating and cooling a mixture of (a) a metal soap (such as a metal stearate) and (b) a plurality of components (such as (i) a metal oxide, hydroxide, or carbonate and (ii) a monocarboxylic acid) which are capable of reacting together under heat and/or pressure to form a metal soap. The metal soap pellets of the invention are non-dusting and durable. They are excellent plastics additives and are particularly useful for applications where the presence of a separate binder is unacceptable.

28 Claims, No Drawings

PELLETIZATION OF METAL SOAP POWDERS

BACKGROUND OF THE INVENTION

This invention relates to the formation of pellets from metal soap powders. Metal soaps, such as calcium stearate, aluminum stearate, zinc stearate, and lead stearate are useful industrial chemicals. For instance, these metal soaps are used in the plastics industry as processing aids to assist in the manufacture of plastics and plastic products.

One disadvantage of such metal soaps is that they are typically manufactured in ways that result in a finely divided powder which is easily suspended in the air. Since many of these materials can form explosive mixtures with air, and since many are toxic upon inhalation, it is necessary to control the dust generated by such powders.

One way of limiting the dust of metal soaps is to convert the soap into a paste by the addition of an inert solvent or diluent. However, pastes are difficult to work with and cannot be measured out accurately in small quantities. They also are difficult to blend uniformly in the resin because of their cohesive tendency and their slow flow rate, even under the pressure and stress of mixing.

U.S. Pat. No. 4,235,794 (Rieber; Chemische Werke München Otto Barlocher; 1980) teaches the manufacture of metal soaps directly into granulates without going through a powder stage. This is done by reacting (1) an aqueous solution or suspension of a metal oxide, metal hydroxide, or metal carbonate with (2) a water-insoluble $C_8$ to $C_{32}$ fatty acid having a melting point of 0° C. to 100° C., under constant agitation at a temperature below the melting point of the acid until a structurally stable crust of metal soap has formed, and thereafter continuing the reaction at a temperature above the melting point of the acid. While such a process may produce relatively non-dusting granules, the process unfortunately requires investment in specialized mixing, filtration, and drying equipment, and may require specially trained operators. Furthermore, because of the frangible nature of the granules produced by this method, the drying process itself may cause the generation of fines and dust, creating a considerable explosion hazard.

U.S. Pat. No. 4,368,139 (Pollock; Argus Chemical; 1983) discloses absorbing a liquid epoxy fatty acid ester onto the metal soap to render it non-dusting, while maintaining its flowability. The powder of this method, however, lacks the handling advantages of pellets, such as the ability to use the material in a conventional screw feeder. Moreover, the presence of a liquid epoxy fatty acid ester renders the pellets produced by this method unsuitable many applications.

U.S. Pat. No. 5,028,486 (Dunski; Mallinckrodt Specialty Chemicals Company; 1991) teaches a tableting method in which a metal soap is mixed with a binder such as mineral oil, low melting wax, fats, fatty acids, and silicone oil, and compressing the mixture into pellets. While this method does indeed produce stable pellets, it is unsuitable for end use applications in which the presence of the binder is unacceptable.

It would be desirable to produce metal soap pellets by compression of the metal soap without the use of a binder. However, in the absence of a binder, metal soaps will not compress to form stable pellets. Such pellets, if formed at all, are extremely friable and cause considerable dusting.

SUMMARY OF THE INVENTION

The present invention solves the problem of forming stable pellets without the presence of an objectionable binder by using as a binder, components which, under the conditions of use of the pellet, will react together to form additional metal soap.

DETAILED DESCRIPTION OF THE INVENTION

In this specification and claims, numerical ranges are not critical unless otherwise stated. That is, the numerical ranges may be read as if they were prefaced with the word "about" or "substantially".

One component of the invention is a metal soap. By the term "metal soap" is meant a salt of a metal and a monocarboxylic acid.

Generally the metal will be calcium, magnesium, aluminum, zinc, cadmium, sodium, potassium, tin, or lead, and preferably will be calcium, magnesium, or zinc.

The monocarboxylic acid is preferably saturated although some unsaturation (e.g.: 5 to 10 percent of the acid molecules) will not be unduly deleterious. Although unsaturation will not hinder the formation of the pellets, it will generally be undesirable in typical end uses in the plastics industry, because the unsaturation will tend to cause coloration and/or brittleness of the plastic. The acid is also generally a straight-chain acid, although in some instances branched acids will be acceptable or even desirable. The acid will generally have 12 to 22 and desirably 14 to 20 carbon atoms. In a preferred embodiment at least 80 percent of the acid will be species having 16 to 18 carbon atoms. A particularly suitable source of the acid component is commercially available stearic acid derived from natural sources. Such commercial stearic acid typically has about 50–65 percent stearic acid ($C_{18}$), about 30–45 percent palmitic acid ($C_{16}$), and about 1–5 percent oleic acid ($C_{18}$ monounsaturated). In some instances commercially available isostearic acid will be useful. Such commercial isostearic acid is a complex mixture of primarily saturated isomers (primarily of the methyl-branched series) of the general formula $C_{17}H_{35}COOH$.

The metal soap is most preferably zinc stearate or calcium stearate and is most preferably used in a granular form.

The metal soap may be manufactured by any conventional process, such as by precipitation of the reaction product of the metal carbonate, metal oxide, or metal hydroxide with the acid. Such processes are well known in the art.

The metal soap is combined with a binder. The binder comprises a plurality of components which are capable of reacting together under heat and/or pressure (i.e.: the conditions to which the metal soap pellet will be subjected in use) to form a metal soap. Such components are desirably a metal carbonate, metal oxide, or metal hydroxide, and a monocarboxylic acid.

The metal of the metal carbonate, metal oxide, or metal hydroxide component of the binder is desirably calcium, magnesium, aluminum, zinc, cadmium, sodium, potassium, barium, tin, or lead, and preferably is calcium, magnesium, or zinc. Preferred species of the metal carbonate, metal oxide, or metal hydroxide are magnesium carbonate, magnesium oxide, zinc carbonate, zinc oxide, calcium oxide, and calcium hydroxide. Of these, the zinc and calcium species are more preferred.

The monocarboxylic acid portion of the binder is as described above with reference to the metal soap.

The powdered metal soap and the metal soap to be formed from the binder need not be the same, but preferably both the metal portions and the acid portions are identical.

The binder components (i.e.: the metal carbonate, metal oxide, or metal hydroxide and the monocarboxylic acid) are preferably used in equimolar or nearly equimolar amounts so that there will be essentially no unreacted binder components when the pellets are used. Generally there should be less than 20, desirably less than 15, preferably less than 10, and most preferably less than 5 molar percent excess of either binder component. In instances where residual metal carbonate, metal oxide, or metal hydroxide will not be objectionable, a slight excess (e.g.: 1 to 10 percent) of the metal component may help drive the reaction of the metal component and the acid to completion.

The amount of total binder components to be used with the metal soap may vary depending on the nature of the materials being used, the intended application, and the method of formation of the pellets. In the broadest terms the pellets may contain from 0.1 to 99.9 weight percent binder. However, as a general rule the final pellet should contain from 0.1 to 30, desirably 0.5 to 15, and preferably 1 to 10 weight percent binder components if the pellets are to be formed by compression (e.g.: tablets). If the pellets are to be formed by melting and cooling (e.g.: pastilles), the final pellet should contain from 20 to 70, desirably 30 to 60, and preferably 40 to 50 weight percent binder components. A larger proportion of binder is necessary to form the pastilles because sufficient acid must be present to allow the mixture to form drops when the acid is raised above its melting point (generally 50 to 70° C.).

If its presence would not be objectionable in the ultimate application, a small amount of a catalyst may be resent. For instance, 0.0005 to 0.01 weight percent (based on the weight of the fatty acid) of azeleic acid (1,7-heptanedicarboxylic acid) may be added to catalyze the reaction of the fatty acid and the metal component. It should be noted that commercial fatty acids typically contain small amounts of azeleic acid or similar acids, so some catalytic activity will inherently be present.

The metal soap and the components of the binder are generally mixed by conventional mixing equipment such as a ribbon blender. The mixture of the metal soap and binder components can then be pelletized by any conventional means.

In the instance of forming pastilles, the metal soap and binder components are desirably mixed when the fatty acid of the binder is melted. In a particularly favorable embodiment of the manufacture of pastilles, a metal carbonate, metal oxide, or metal hydroxide is mixed with an acid (in the substantial absence of a metal soap), preferably in the presence of a catalyst such as azeleic acid, and heated to cause the metal component and the acid component to react to form a metal soap in situ. In this embodiment generally 0.1 to 60, desirably 1 to 55, preferably 5 to 50, and most preferably 10 to 45 weight percent of the metal and acid will have reacted before or during the formation of the pastilles.

one suitable means of pelletizing is by compression such as with a pellet mill, slug mill, or tableting press. Such processes are very well known in the art and require no elaboration here.

A suitable non-compression means of pelletizing is to form pastilles by heating the mixture until the acid portion of the binder components becomes liquid enough that the mixture may be dropped onto a conveyor belt or spinning disk where the drops cool and become solid. The heating step in the formation of pastille pellets may cause some reaction of the binder components (and indeed, as mentioned above, in one embodiment preferably causes substantial reaction of the binder components), but as long as there is sufficient unreacted acid to maintain the integrity of the pellet, such possible reaction is not of concern. Of some concern is that the mixture not be heated so high as to degrade any heat-sensitive additives (such as antioxidants) which may be present.

The thusly formed pellets are strong, physically coherent pellets that can be subjected to normal shipping and handling conditions with minimum breakage or dusting.

The pellets of the invention may be conveniently used in conventional processes requiring metal soaps. For instance, they can be used in plastic resins as a processing aid to inactivate residual catalyst and/or to add lubricity to the resin. The metal soaps of the invention can be added to the feed of an extruder along with the raw plastic resin. The shear forces of the extruder will break apart the pellet and the heat and/or pressure of the extrusion process will cause the binder components to react to form additional metal soap. Thus, the finished resin from the extruder will be free of any objectional binder and will contain only the metal soap.

Although optional, other active ingredients such as antioxidants, lubricants, fillers, UV absorbers, neutralization agents, and fire retardants may be added to the pellets of the invention. Such optional ingredients are preferably added when the binder components are mixed with the metal soap.

The invention will be further explained in the following examples. In the examples, all parts and percentages are by weight, unless otherwise specified.

EXAMPLE 1

(Comparative)

Generally following the method of the above-referenced U.S. Pat. No. 5,028,486, a plastics additive mixture of the following composition was prepared:

| Ingredients | Parts |
| --- | --- |
| HyDense ® calcium stearate (Mallinckrodt) | 39 |
| Irganox ® 1010 antioxidant (Ciba Geigy) | 39 |
| Zinc stearate granular (Mallinckrodt) | 22 |

The mixture was fed through a California® pellet mill using a ⅛" (3.175 mm) die set at ½" (12.7 mm), but no pellets could be formed.

EXAMPLE 2

Generally following the procedure of Example 1, the following plastics additive mixture was prepared:

| Ingredients | Parts |
| --- | --- |
| HyDense ® calcium stearate (Mallinckrodt) | 39 |
| Irganox 1010 antioxidant (Ciba Geigy) | 39 |
| Zinc stearate granular (Mallinckrodt) | 22 |
| Hydrogenated tallow fatty acids | 3 |
| Calcium Oxide | 0.1 |

The mixture was fed through a California® pellet mill using a ⅛" (3.175 mm) die set at ½" (12.7 mm), to produce stable, durable pellets.

EXAMPLE 3

The procedure of Example 2 was repeated using Calcium Hydroxide in place of the Calcium Oxide. Stable, durable pellets were again formed.

EXAMPLE 4

A test quantity of pellets produced by the process of Example 2 were provided to a manufacturer of plastic resins who incorporated the pellets into a plastic resin by metering the pellets into an extruder along with the raw resin. The manufacturer reported that the pellets blended uniformly and that there was no indication of any problems caused by free calcium oxide or fatty acid.

EXAMPLE 5

A 1-liter resin flask provided with agitation, $N_2$ blanket and condenser (set downward) was charged with 552 g of tallow fatty acid (acid value=194–210 mg KOH/g; iodine value<1.0) and the acid was melted. 89 g of ZnO (10% excess) and 0.4 g azeleic acid (as a catalyst) were added and the mixture agitated at 65–70° C. to attain a thorough dispersion of ZnO. 126 g of Irganox 1076 antioxidant was added and the mixture was stirred for a few hours at 65–70° C. for several hours. The mixture formed excellent droplets which were dripped onto a cool surface to form a pastille pellet having a diameter (as viewed from above the cool surface) of 2 to 3 mm. Extraction of the pastille pellets with acetone followed by titration with KOH in alcohol indicated that about one third of the ZnO and fatty acid had reacted.

EXAMPLE 6

The pastille pellets of Example 5 were blended with linear low density polyethylene resin at 2000 ppm by sending the resin and pastilles 1, 2, or 3 times through a 1 inch (25 mm) single-screw extruder operating at 260° C. and 60 rpm; cooling and pelletizing the mixture after each extruder pass.

EXAMPLE 7

(Comparative)

A room-temperature loose mixture of 83% zinc stearate (Mallinckrodt Specialty Chemicals Company, Hydense® 5903) and 17% Irganox 1076 antioxidant was prepared. It was difficult to handle the mixture due to dust and fines. The mixture was incorporated at a 2000 ppm level into resin as in Example 6.

EXAMPLE 8

To evaluate the invention, samples from the first and third pass of the extruder runs of Example 6 and Example 7 were extracted with acetone to determine the percent of extractable components. The results are reported in Table I. These results show that in Example 6 (the invention) on the first pass through the extruder essentially all of the ZnO and tallow fatty acid had reacted, and by the third pass through the extruder the oxide and acid had completely reacted. Infrared analysis of carbonyl levels confirmed the extraction data.

TABLE I

| SAMPLE | 1st PASS % RESIDUE | 3rd PASS % RESIDUE |
| --- | --- | --- |
| Example 6 (invention) | 0.21 | 0.19 |
| Example 7 (comparative) | 0.19 | 0.19 |

EXAMPLE 9

Using resin from the second pass of the extruder from Example 6 and Example 7, 2 inch×2 inch×⅛ inch (57 mm×57 mm×3.2 mm) blocks were compression molded and aged 30 days at 60° C. The whiteness index and yellowness index (ASTM E313) was determined before and after ageing using a Hunter Lab Scan II® and the change in the indexes recorded. The results are reported in Table II. Because the differences between the values for the resins of Examples 6 and 7 are not statistically significant, the data provide additional evidence that there is little or no unreacted ZnO or tallow fatty acid in the resin of Example 6. In other words, the data suggest that sending the resin through the extruder resulted in complete reaction of the acid and ZnO.

TABLE II

| SAMPLE | Δ WHITENESS INDEX | Δ YELLOWNESS INDEX |
| --- | --- | --- |
| Example 6 (invention) | 0.49 ± 0.2 | 0.98 ± 0.16 |
| Example 7 (comparative) | 0.69 ± 0.08 | 1.36 ± 0.08 |

What is claimed is:

1. A metal soap pellet comprising (a) a metal soap and (b) a binder comprising a plurality of components which are capable of reacting together under heat and/or pressure to form a metal soap.

2. The pellet of claim 1 wherein said metal soap comprises a monocarboxylic acid salt of calcium, magnesium, aluminum, zinc, cadmium, sodium, potassium, barium, tin, or lead.

3. The pellet of claim 2 wherein said metal soap comprises a monocarboxylic acid salt of calcium, magnesium, or zinc.

4. The pellet of claim 3 wherein the monocarboxylic acid portion of said salt has 12 to 22 carbon atoms.

5. The pellet of claim 4 wherein the monocarboxylic acid portion of said salt comprises a saturated, unbranched acid having 14 to 20 carbon atoms.

6. The pellet of claim 5 wherein the monocarboxylic acid portion of said salt comprises commercial stearic acid.

7. The pellet of claim 1 wherein said binder comprises (a) a metal carbonate, metal oxide, or metal hydroxide and (b) a monocarboxylic acid.

8. The pellet of claim 7 wherein the monocarboxylic acid has 12 to 22 carbon atoms.

9. The pellet of claim 8 wherein the monocarboxylic acid comprises a saturated, unbranched acid having 14 to 20 carbon atoms.

10. The pellet of claim 9 wherein the monocarboxylic acid comprises commercial stearic acid.

11. The pellet of claim 7 wherein the metal of the metal carbonate, metal oxide, or metal hydroxide comprises calcium, magnesium, aluminum, zinc, cadmium, sodium, potassium, barium, tin, or lead.

12. The pellet of claim 11 wherein the metal carbonate, metal oxide, or metal hydroxide comprises magnesium carbonate, magnesium oxide, zinc carbonate, zinc oxide, calcium oxide, or calcium hydroxide.

13. The pellet of claim 7 wherein none of said binder components are present in more than 5 molar percent excess of the other component.

14. The pellet of claim 1 wherein substantially all of the metal soap present in the pellet was formed in situ during the manufacture of the pellet.

15. A metal soap pellet comprising (a) zinc stearate and (b) a binder comprising (i) zinc carbonate and/or zinc oxide, and
(ii) commercial stearic acid.

16. A method of pelletizing a metal soap comprising
(a) mixing
(i) a metal soap with
(ii) a binder comprising a plurality of components which are capable of reacting together under heat and/or pressure to form a metal soap; and
(b) forming the mixture into pellets.

17. The method of claim 16 wherein at least a portion of said metal soap in the pellets is formed by reaction of the binder components prior to the formation of the pellets.

18. The method of claim 17 wherein substantially all of said metal soap in the pellets is formed by reaction of the binder components prior to the formation of the pellets.

19. The method of claim 16 wherein the binder comprises
(a) a metal carbonate, metal oxide, or metal hydroxide and
(b) a monocarboxylic acid.

20. The pellet of claim 19 wherein none of said binder components are present in more than 5 molar percent excess of the other component.

21. The method of claim 19 wherein said monocarboxylic acid has 12 to 22 carbon atoms.

22. The method of claim 21 wherein said monocarboxylic acid comprises a saturated, unbranched acid having 14 to 20 carbon atoms.

23. The method of claim 22 wherein said monocarboxylic acid comprises commercial stearic acid.

24. The method of claim 19 wherein said metal of the metal carbonate, metal oxide, or metal hydroxide comprises calcium, magnesium, aluminum, zinc, cadmium, sodium, potassium, barium, tin, or lead.

25. The method of claim 24 wherein the metal carbonate, metal oxide, or metal hydroxide comprises magnesium carbonate, magnesium oxide, zinc carbonate, zinc oxide, calcium oxide, or calcium hydroxide.

26. The method of claim 16 wherein said forming comprises compressing the mixture into tablets.

27. The method of claim 16 wherein said forming comprises heating the mixture to a liquid state, forming droplets of the liquid mixture, and cooling the droplets to form pastilles.

28. The method of claim 27 wherein said droplets are dropped onto a surface and cooled to form pellets.

* * * * *